United States Patent
Zhang et al.

(10) Patent No.: US 7,839,331 B2
(45) Date of Patent: Nov. 23, 2010

(54) SATELLITE CLOCK PREDICTION

(75) Inventors: Geugsheng Zhang, Cupertino, CA (US);
Makarand S. Phatak, Sunnyvale, CA (US); Lionel J. Garin, Palo Alto, CA (US); Marlene Wan, Sunnyvale, CA (US)

(73) Assignee: SiRF Technology, Inc., San Jose, CA (US)

( * ) Notice: Subject to any disclaimer, the term of this patent is extended or adjusted under 35 U.S.C. 154(b) by 241 days.

(21) Appl. No.: 11/694,430

(22) Filed: Mar. 30, 2007

(65) Prior Publication Data
US 2008/0238765 A1 Oct. 2, 2008

(51) Int. Cl.
*G01S 19/27* (2010.01)

(52) U.S. Cl. .................................. 342/357.66

(58) Field of Classification Search ............ 342/357.09, 342/357.15, 357.66
See application file for complete search history.

(56) References Cited

U.S. PATENT DOCUMENTS

| | | | | |
|---|---|---|---|---|
| 6,211,819 B1 * | 4/2001 | King et al. | ............ | 342/357.09 |
| 6,323,803 B1 * | 11/2001 | Jolley et al. | ............ | 342/357.03 |
| 6,438,382 B1 * | 8/2002 | Boesch et al. | ............ | 455/456.6 |
| 6,560,534 B2 * | 5/2003 | Abraham et al. | ............ | 701/213 |
| 7,443,340 B2 * | 10/2008 | Abraham et al. | ....... | 342/357.06 |
| 2002/0188403 A1 | 12/2002 | LaMance et al. | | |
| 2002/0190898 A1 * | 12/2002 | Abraham et al. | ....... | 342/357.09 |
| 2006/0055598 A1 * | 3/2006 | Garin et al. | ............ | 342/357.15 |
| 2008/0024361 A1 * | 1/2008 | Diggelen et al. | ....... | 342/357.03 |
| 2008/0186228 A1 * | 8/2008 | Garin et al. | ............ | 342/357.12 |

FOREIGN PATENT DOCUMENTS

| | | | |
|---|---|---|---|
| GB | 2271902 | * | 4/1994 |
| WO | WO 02/21150 | | 3/2002 |
| WO | WO 02099454 A2 | * | 12/2002 |

OTHER PUBLICATIONS

Garin et al., A Novel Ephemeris Extension Compaction/Decompaction Method, Proceedings of the ION 63rd Annual Meeting, Apr. 23-25, 2007, pp. 504-510, Cambridge MA.

* cited by examiner

*Primary Examiner*—Gregory C Issing
(74) *Attorney, Agent, or Firm*—Haynes and Boone, LLP.

(57) ABSTRACT

Devices and methods are described for determining position information without broadcast ephemeris data for a spanned time period using predictions of future satellite states. These predictions include predictions of satellite clock bias. During the spanned time period, broadcast ephemeris is received such that a broadcast-ephemeris-derived satellite clock bias may be determined. The predictions of satellite clock bias subsequent to the receipt of the broadcast ephemeris may then be corrected based upon the broadcast-ephemeris-derived satellite clock bias.

15 Claims, 4 Drawing Sheets

SATELLITE CLOCK PREDICTION

FIELD OF INVENTION

The disclosed embodiments relate to satellite based positioning systems and methods. More particularly, the disclosed embodiments relate to adjusting clock bias prediction based upon received broadcast ephemeris.

BACKGROUND

Satellite-based positioning systems include constellations of earth orbiting satellites that constantly transmit orbit information and ranging signals to receivers. An example of a satellite-based positioning system is the Global Positioning System (GPS), which includes a constellation of earth orbiting satellites, also referred to as GPS satellites, satellite vehicles, or space vehicles (SVs). The GPS satellites circle the earth twice a day in a very precise orbit and transmit signal information to the earth. The satellite signal information is received by GPS receivers which can be in portable or mobile units, or in fixed positions on base stations and/or servers.

The GPS receiver uses the satellite signal information to calculate its precise location. Generally the GPS receiver compares the time GPS signals or satellite signals were transmitted by a satellite with the time of receipt. This time difference between satellite signal reception and transmission provides the receiver with information as to the range of the receiver from the satellite. Using pseudo-range measurements (pseudo because the range information is offset by an amount proportional to the offset between GPS satellite clock and receiver clock) from a number of satellites, the receiver can determine its position. The GPS receiver uses received signals from at least four satellites to calculate three-dimensional position (latitude, longitude, and altitude), or at least three satellites to calculate two-dimensional position (if altitude is known).

The GPS satellite signals travel by line of sight, meaning they will pass through clouds, glass and plastic but will not get through most solid objects such as buildings and mountains. Generally, then, GPS receivers are usable everywhere except where it is impossible to receive an adequate satellite signal such as inside some buildings, in caves and other subterranean locations, and underwater. A GPS receiver, when determining position information, typically relies on information from the satellite signal, the absence of which makes position determination impossible. This satellite signal information includes a pseudorandom code along with ephemeris and almanac data to the receivers. The pseudo-random code is a code that identifies the satellite that is transmitting the corresponding signal and also helps the receiver to make ranging measurements. The almanac data tells the GPS receiver where each GPS satellite of the constellation should be at any time over a wide time interval that spans a few days or weeks. The ephemeris data does the same thing but much more accurately though over a much shorter time interval of a few hours.

The broadcast ephemeris data, which is continuously transmitted by each satellite, contains important information about the orbit of the satellite, and time of validity of this orbit information. In particular, the broadcast ephemeris data of a GPS satellite predicts the satellite's state over a future interval of approximately four hours. Broadcast ephemeris includes predictions of satellite position, velocity, clock bias, and clock drift. More particularly, the broadcast ephemeris data describe a Keplerian element ellipse with additional corrections that then allow the satellite's position to be calculated in an earth-centered, earth-fixed (ECEF) set of rectangular coordinates at any time during the period of validity of the broadcast ephemeris data. Typically, the broadcast ephemeris data is essential for determining a position.

Considering that the broadcast ephemeris data is only valid for a four hour interval and is essential for position determination, a GPS receiver is required to collect new broadcast ephemeris data at such time as the receiver needs to compute the satellite state when the validity time for the previously-collected broadcast ephemeris data has expired. Broadcast ephemeris that is still valid may be referred to as "current" broadcast ephemeris. Current broadcast ephemeris data can be collected either as direct broadcast from a GPS satellite or re-transmitted from a server. However, there are situations under which it is not possible to collect new broadcast ephemeris data from GPS satellites or from a server. As an example of situations in which new broadcast ephemeris data cannot be collected, a low signal strength of the satellite signals can prevent decoding/demodulating of the ephemeris data from the received satellite signal, the client can be out of coverage range of the server, and/or the server can be unavailable for a number of reasons, to name a few. When new broadcast ephemeris data is not available, the GPS receiver is typically unable to provide position information.

To address the need in the art for GPS receivers operable to determine satellite ephemeris without reception of current broadcast ephemeris, commonly-assigned U.S. Pat. No. 7,142,157 (the '157 patent) discloses a server that receives or collects historical state data of satellites for a satellite-based positioning system and numerically integrates the historical state data to provide predictions of satellite trajectories ("extended ephemeris") based upon the historical state data. These predicted satellite states may also be denoted as satellite ephemeris.

It will be appreciated by those of ordinary skill in the arts that the term ephemeris is then being used in its strict sense. Although it is conventional in the GPS arts to refer to the transmission of Kepler parameters by the GPS satellites as "broadcast ephemeris," Kepler parameters are not true satellite ephemeris but instead are parameters derived from satellite ephemeris. Because the reference to the conventional transmission of Kepler parameters from GPS satellites as "broadcast ephemeris" is a firmly-entrenched practice in the GPS arts, the results from a numerical integration of historical state data may be referred to as "predicted satellite states" or "extended ephemeris" to avoid confusion with parameters such as Kepler parameters that are merely derived from satellite ephemeris.

Having calculated the predicted satellite states, the server may transmit these states to client GPS-enabled devices. These client devices may then calculate current satellite ephemeris based upon the predicted satellite states. A time period spanned by the predicted satellite states depends upon the desired accuracy. For example, if +/−40 meter accuracy is acceptable, the predicted satellite states may correspond to every 15 minutes over a seven day period for all the satellites in the GPS constellation. To determine satellite states at a current time within this seven day period, the client device need then merely interpolate the relevant predicted satellite states about the current time. In this fashion, the client device needs relatively little processing power to determine current satellite states. However, considerable bandwidth and storage facilities must be dedicated to the transmission and storage of so many predicted satellite states.

Thus, the '157 patent discloses alternative embodiments in which the server does not generate predicted satellite states but instead generates parameters derived from these predicted satellite states such as Kepler parameters. A client device receives the Kepler parameters from the server and may thus predict satellite trajectories using the Kepler parameters. In this fashion, bandwidth demands for the transmission between the server and the client devices are reduced.

Predicted satellite ephemeris may also be referred to as "extended ephemeris" to distinguish these values from conventional broadcast ephemeris. As discussed above, ephemeris includes not only satellite position but also satellite clock bias. This bias is related to a difference between a GPS reference time and the time determined by a satellite's clock. In general, historical satellite state data may be studied to generate a prediction of clock bias such as by using a curve-fit of past clock bias data. The historical clock bias data may be curve-fit using a linear or polynomial equation. However, because of the stochastic nature of clock bias, the prediction of clock bias typically becomes progressively worse as the period of time over which the prediction is made is lengthened. For example, if just a day has past since the last reception of broadcast ephemeris, the clock bias as predicted through extended ephemeris techniques may be fairly accurate. However, if a week has past since the last reception, the clock bias as predicted through extended ephemeris techniques may introduce relatively large errors if used in a position determination.

Accordingly, there is a need in the art for improved predictions of satellite clock bias.

SUMMARY

In accordance with an aspect of the invention, a method for determining a position of a client device is provided that includes: receiving sets of parameters over a first communication channel, wherein the sets of parameters span a period of time, and wherein each set of parameters is representative of predicted satellite states for a particular sub-period of time within the spanned period of time such that a first set of parameters is representative of the predicted satellite states in a first sub-period of time, a second set of parameters is representative of the predicted satellite states for a subsequent second sub-period of time, and so on, and wherein the sets of parameters include predictions of satellite clock biases; during the spanned period of time, receiving broadcast ephemeris over a second communication channel at a given time, the broadcast ephemeris including a broadcast ephemeris clock bias, wherein a subset of the parameters correspond to sub-periods of time subsequent to the given time; and modifying the predictions of satellite clock biases in the subset of parameters based upon the broadcast ephemeris clock bias.

In accordance with another aspect of the invention, a device is provided that includes: a state reconstructor that selectively reconstructs a current satellite state based upon predictions of satellite states, wherein the predictions of satellite states span a period of time and include predictions of satellite clock bias, the state reconstructor being configured to modify the predictions of satellite clock bias based upon received broadcast ephemeris; and at least one signal processor that uses the at least one reconstructed satellite state to acquire a satellite signal.

In accordance with another aspect of the invention, a device is provided that includes: a memory for storing predictions of satellite states, wherein the predictions of satellite states comprises sets of predictions spanning a period of time such that a first set of predictions corresponds to satellite states for a first sub-period of time in the spanned period, a second set of predictions corresponds to satellite states for a second subsequent sub-period of time in the spanned period, and so on, and wherein the prediction of satellite states are derived from previously-received broadcast ephemeris; means for reconstructing satellite states at any given time during the spanned period based upon the stored predictions of satellite states; means for modifying the stored predictions of satellite states based upon broadcast ephemeris received during the spanned period; and a location determination system adapted to use the reconstructed satellite states in a determination of a location for the device at the given time if current broadcast ephemeris is unavailable at the given time.

BRIEF DESCRIPTION OF THE DRAWINGS

These figures are provided to assist in describing embodiments of the invention, and are not intended to be exclusive or limiting. In the figures, like reference numerals designate like elements.

DETAILED DESCRIPTION

In the following description, numerous specific details are introduced to provide a thorough understanding of, and enabling description for, embodiments of the positioning system. One skilled in the relevant art, however, will recognize that the positioning system can be practiced without one or more of the specific details, or with other components, systems, etc. In other instances, well-known structures or operations are not shown, or are not described in detail, to avoid obscuring aspects of the positioning system.

Devices and methods are described for determining position without the use of current broadcast ephemeris data for extended time periods. These determinations use predictions of satellite states denoted as "extended ephemeris" in that a GPS device extends its functionality despite the absence of current broadcast ephemeris. The extended ephemeris includes predictions of satellite positions and clock bias. In general, the predictions of future satellite states span some period of time such as a week. During this spanned period, a GPS device with access to the corresponding extended ephemeris (EE) may also receive broadcast ephemeris (BE). For example, a GPS device may be configured with EE data at the start of the spanned period, which will be assumed without loss of generality in the following discussion to be one week, starting from a day one and extending through a day seven. Suppose that on a given day during this week, the GPS device has access to BE data. The GPS device may then correct the remaining predictions of clock bias in the EE data from this day through day seven based upon a BE-data-derived clock bias as will be explained further herein. The predictions of satellite clock bias discussed herein may be practiced in any type of extended ephemeris implementation. The following discussion is directed to a satellite clock bias correction for GPS client devices that receive extended ephemeris from an extended ephemeris server. However, it will be appreciated that the satellite clock bias correction disclosed herein may be practiced in extended ephemeris implementations in which a GPS device is enabled to predict future satellite states based upon previously-received broadcast ephemeris as disclosed, for example, in commonly-assigned U.S. patent application Ser. No. 11/555,074, filed Oct. 31, 2006.

In a server-based extended ephemeris implementation, an extended ephemeris server collects historical state data of satellites of a satellite-based positioning system and generates predictions of future satellite trajectories (extended ephemeris) for a future predetermined time period. In one embodiment, the future states for each satellite in the constellation of GPS satellites may be estimated in intervals of fifteen minutes. A first set of state information for all the satellites would correspond to an initial time, a second set of state information would correspond to a time fifteen minutes later, and so on. In this fashion, a plurality of sets of extended ephemeris data may predict the GPS satellite states for a predetermined period such as a seven day period. The extended ephemeris server then transmits the resulting extended ephemeris data to the GPS client devices. At any given time during the predetermined period of extended ephemeris validity, a GPS client device selects a set of extended ephemeris data appropriate to the given time from the sets of extended ephemeris data. The GPS client device may then generate satellite states for the given time from the selected set of extended ephemeris data and use the satellite states (in conjunction with pseudo-range calculations) to determine its position at the given time.

Figure 1:
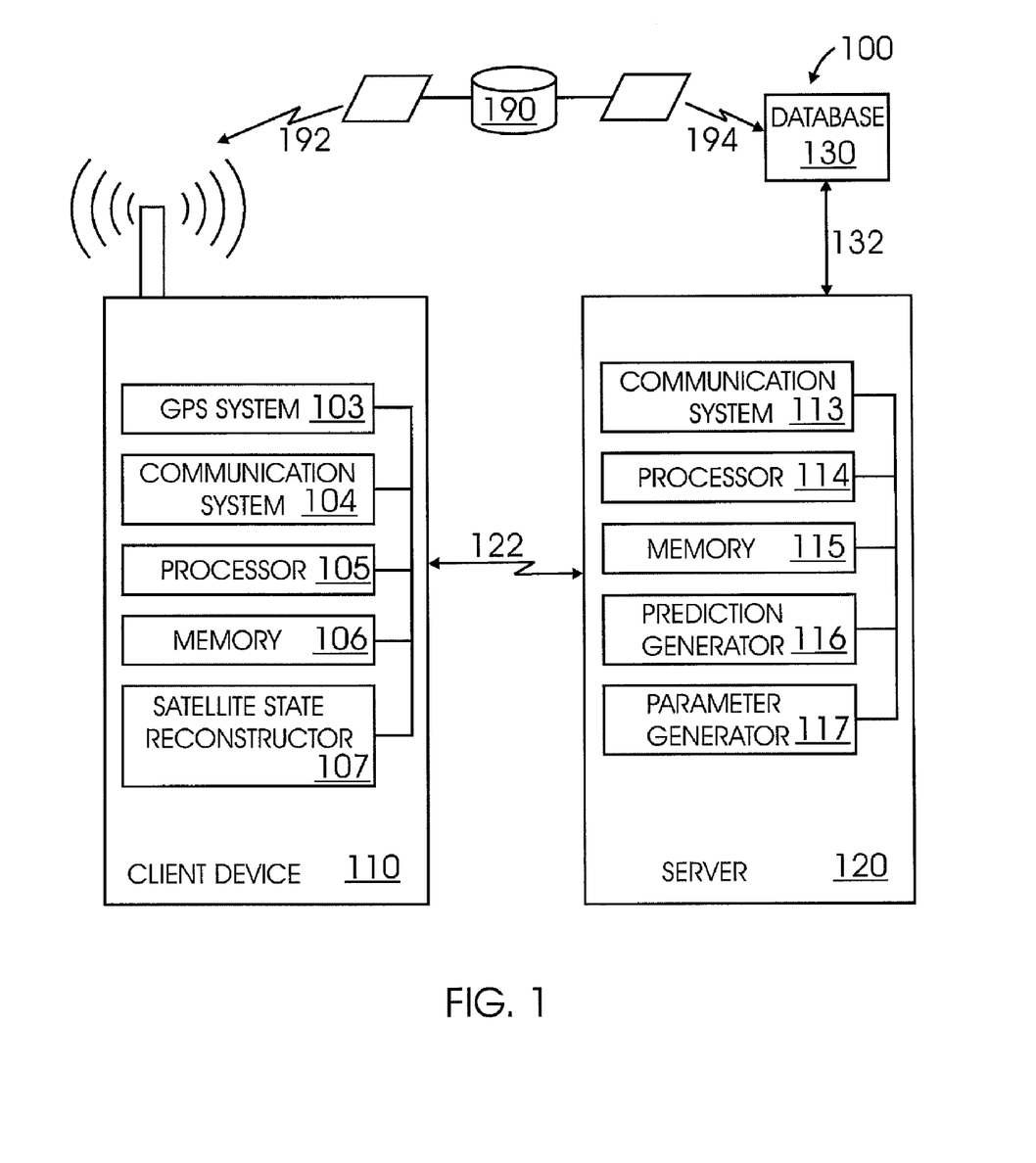
FIG. 1 is a block diagram of a GPS system in accordance with an embodiment of the invention.

FIG. 1 is a block diagram of an exemplary system 100 comprising one or more GPS client devices 110 that may determine their position without the use of broadcast ephemeris (BE) data through the use of extended ephemeris data. System 100 includes at least one GPS client device 110 and at least one extended ephemeris server system 120 or network of servers 120, referred to herein as server 120. GPS client devices 110 receive information from GPS satellites 190 in view via GPS signals 192. GPS client devices 110 and extended ephemeris servers 120 communicate via at least one communication channel or link 122 which comprises wireless and/or wired couplings 122. To assist the transmission of ephemeris data over link 122, extended ephemeris server 120 may include a communication system 113, a processor 114, and a memory 115. Extended ephemeris server 120 of an embodiment also communicates with one or more databases 130 to request and/or receive data on past GPS satellite trajectories via at least one channel or link 132. Link 132 between servers 120 and databases 130 includes at least one of wireless and/or wired couplings. Link 132 of alternative embodiments can include one or more networks (not shown) having one or more network types.

GPS client devices 110 of an embodiment include but are not limited to portable communication devices, portable position tracking devices, cellular telephones, cellular telephones coupled to and/or integrated with position tracking devices, mobile electronic devices, mobile communication devices, personal computers (PCs), personal digital assistants (PDAs), and other processor-based devices. As one example, GPS client device 110 is a cellular telephone 110 and extended ephemeris server 120 is coupled to the cellular service provider's network such that communication link 122 is a wireless connection. As another example, GPS client device 110 is a PDA 110 and extended ephemeris server 120 is that of a GPS service provider such that communication link 122 is a wireless and/or wired connection using the Internet. These configurations are provided only as examples, and do not limit the embodiments described herein.

Generally, extended ephemeris server 120 of an embodiment predicts states of all GPS satellites 190 over a predetermined period of arbitrary duration. Extended ephemeris server 120, using historical information received from database 130, may generate the predictions by fitting parameters to a satellite's force model. The satellite force model is derived for each satellite using past trajectory data of the satellite.

In one embodiment, extended ephemeris server 120 may include a prediction generator 116 that predicts satellite states using historical satellite data from database 130. The historical trajectory or state data of database 130 includes mainly historical position state vectors of satellite trajectories and clock biases of satellites but can include other information. More specifically, the historical state data includes at least one of or some combination of satellite position state vectors, satellite velocity state vectors, satellite clock biases, and satellite clock rate errors. As discussed previously, this historical state data is more accurate than broadcast ephemeris data. Database 130 can be a component of the server system 120, or can be a standalone server or system. Further, database 130 can be that of an appropriate provider of such historical information. One example of a provider from which the historical satellite information is received is the International GPS Service (IGS). Alternatively, the historical satellite data is generated and provided by components of the server 120.

In one embodiment, prediction generator 116 numerically integrates equations of motion for the GPS satellites using the historical state data to predict future satellite states. In other words, a satellite force model is derived for each satellite using past trajectory data of the satellite. Once parameters are found that fit the force model and provide the initial position and velocity, prediction generator 116 uses the fitted parameters in numerical integrations of differential equations of satellite dynamical motion from which predicted satellite states are generated periodically across a future period. The predicted satellite states include, but are not limited to, predictions of position state vectors of future satellite trajectories, velocity state vectors of future satellite trajectories, and future satellite clock biases and drifts for the satellites. In general, it will be appreciated that the extent of the future period spanned by the predicted satellite states depends upon the allowable error in the resulting predicted satellite states. For example, if a radial error of +/−40 meters is acceptable, conventional numerical integrations of satellite dynamical motion may be used to provide predicted satellite states that span a period of seven calendar days. Indeed, in the following discussion, it will be assumed that the spanned period is seven calendar days. However, the present invention is not limited to this particular spanned period and includes periods of varying scope. Furthermore, the periods between predicted satellite states (which may also be denoted as "sub-periods") is also arbitrary. In the following discussion, it will be assumed to be 15 minutes. These predictions are made for all the operating GPS satellites, which may equal thirty-two. The collective predictions for all the GPS satellites at a given time comprises a set of extended ephemeris data. If predictions are made for every fifteen minutes of a spanned week, it will thus be appreciated that prediction generator 116 may generate a fairly substantial number of predicted satellite states: 7 days*32 satellites*24 hours/day*(4 fifteen minute periods)/hr equals 21,504 predicted satellite states. It will thus be appreciated that the transmission of so many satellite states places substantial bandwidth demands upon communication channel 122 as well as requiring substantial memory space within a memory 106 in GPS client device 110.

To minimize these bandwidth demands, extended ephemeris server 120 may transmit parameters such as Kepler parameters derived from the predicated satellite states instead of the predicted states themselves. Accordingly, extended ephemeris server 120 may include a parameter generator 117. Although other types of parameters such as Chebyshev approximations may be used, the following discussion will assume that the parameters generated by parameter generator 117 are Kepler parameters. The resulting extended ephemeris data such as Kepler parameters is much compressed compared to the predicted satellite states. However, as also discussed previously, even this compression may still require the transmission of over eight thousand bytes to transmit all the Kepler parameters for all the GPS satellites for a one-day period. Thus, server 120 may compress the Kepler parameters as discussed in commonly-assigned U.S. Provisional Application No. 60/889, 529 filed Feb. 12, 2007.

Regardless of whether the extended ephemeris data is compressed or uncompressed, server communication system 113 may include components that interface with any number of wired/wireless communication channels to support communication with the client device 110 and any other system servers as well as other communication devices. As an example, communication system 113 includes components that provide at least one of cellular telephone communications and radio frequency (RF) communications using at least one of analog protocols and digital protocols, but other communication types/protocols can be supported as known in the art.

GPS client device 110 may obtain extended ephemeris data from server 120 in response to at least one of an appropriate request and/or from data broadcast by the server 120. Upon receiving the parameter data stream, GPS client device 110 need not communicate further with server 120 or any other source of ephemeris information. If the extended ephemeris data was compressed, client device 110 may first decompress the data into their original uncompressed form. The resulting extended ephemeris data may comprise parameters such as Kepler parameters or the predicted satellites states. If the extended ephemeris data comprises Kepler parameters, GPS client device 10 may then use the extended ephemeris to reconstruct the predicted satellite trajectories which are subsequently used to generate satellite acquisition information and/or navigation solutions in a manner consistent with the use of ephemeris data. Accurate position fixes are generated by client device 110 using the predicted satellite trajectories that are valid for future time periods at least as long as one week, but the embodiment is not so limited. Use of the extended ephemeris by client device 110, in addition to removing a dependence on broadcast ephemeris data, also results in relatively improved performance in low Signal-to-Noise Ratio (SNR) environments and interference prone environments and improved time-to-first-fix (TTFF). Regardless of how client device reconstructs or synthesizes a satellite state, such states may be denoted as "new" satellite states to distinguish them from the predicted satellite states generated by server 120.

GPS client device 110 of an embodiment comprises a number of systems including at least one of a GPS system 103, communication system 104, processor 105, memory 106, and satellite state reconstructor 107. GPS system 103, communication system 104, memory 106, and satellite state reconstructor 107 of an embodiment run either autonomously or under control of processor 105, but are not so limited. GPS system 103 includes a receiver that receives information from GPS satellites 190 via GPS signals 192. The information received by GPS client devices 110 via GPS signals 192 includes a pseudorandom code along with broadcast ephemeris and almanac data, but is not so limited. The broadcast ephemeris and almanac data may not be demodulable if the signal-to-noise ratio (SNR) is too low. Advantageously, GPS client device 110 may continue to determine its position using standard GPS processing techniques even though broadcast ephemeris data is not demodulable such that broadcast ephemeris is replaced by reconstructed satellite states provided by satellite state reconstructor 107.

Communication system 104 includes components that interface with any number of wired/wireless communication channels and use any number of communication protocols to support communications between GPS client device 110 and extended ephemeris server 120 as well as other communication devices. As an example, communication system 104 includes components that provide at least one of cellular telephone communications and radio frequency (RF) communications using at least one of analog protocols and digital protocols, but other communication types/protocols are supported as known in the art.

Should the extended ephemeris data comprise parameters derived from satellite states such as a Kepler parameters, a satellite state reconstructor 107 may reconstruct satellite states using the parameters as discussed herein. For example, the extended ephemeris data may comprise sets of Kepler parameters, wherein each set comprises the Kepler parameters for all the GPS satellites for a given period of time such as four or six hours. Should GPS client device be unable to access broadcast ephemeris at a given time, state reconstructor 107 may then use the appropriate set of Kepler parameters (depending upon the given time) to reconstruct satellite states. Satellite state reconstructor 107 of an embodiment includes at least one of hardware, software, and firmware running under control of a processor 105 and/or other processors of GPS client device 110.

Processor 105 includes any collection of computing components, devices and software operating together, as is known in the art. Processor 105 can also be components or subsystems within a larger computer system or network. Processor 105 can also be coupled among any number of components (not shown) known in the art, for example other buses, controllers, memory devices, and data input/output (I/O) devices, in any number of combinations. Further, functions of processor 105 can be distributed across other components of GPS client device 110.

Communication links or channels 122, 132, 192, and 194 include at least one of wireless connections, wired connections, and trace connections. Communication links 122, 132, 192, and 194 also include couplings or connections to other systems as well as networks including local area networks (LANs), metropolitan area networks (MANs), wide area networks (WANs), proprietary networks, and proprietary or backend networks.

Because the transmission of extended ephemeris data in the form of parameters derived from satellite state data such as Kepler parameters is bandwidth efficient, the following discussion will assume without loss of generality that GPS client device receives extended ephemeris data in the form of Kepler parameters. Thus, GPS client device 110 receives a data stream of compressed or uncompressed Kepler parameters from extended ephemeris server 120 using device communication system 104. The data stream is received in response to an appropriate electronic request from GPS client device 110 and/or from data broadcast by the server 120, but is not so limited. GPS client device 110 of some embodiments stores the received data in one or more memory areas 106, but is not so limited. Various components of GPS client device 110 subsequently use the reconstructed satellite state(s) along with other satellite data received from the satellites 190 to generate navigation solutions using known GPS signal processing methods. Accurate position fixes can be generated by GPS client device 110 for a period at least as long as one week using information of the compact satellite parameters instead of broadcast ephemeris data.

Each received set of Kepler parameters has a validity corresponding to a sub-period of the spanned time period. In one embodiment, the spanned time period is seven days and each sub-period is six hours. For a given time within this seven day period, satellite state reconstructor 107 may select the corresponding set of Kepler parameters that correspond to the sub-period that includes the given time. This selected set may then be used to recover the satellite states required for position determination at the given time.

Extended ephemeris server 120 may transfer the Kepler parameters in one or any other number of sets. Furthermore, the recovered Kepler parameters may be used to generate predictions without first being stored. Moreover, in yet other alternative embodiments, all predictions can be generated (upon receipt or following receipt) for the entire span of the future time period and then the predictions can be stored in client device memory.

In general, the period of time for which a given set of Kepler parameters is valid is a function of the forces on GPS satellites 190 and the quality of the curve fit using the Keplerian parameters. The forces on satellites 190, in descending order of importance, include: the gravitational field of the Earth; the gravitational field of the Moon; the gravitational field of the Sun; radiation pressure (sunlight absorbed/reflected from the satellite); thermal radiation from the satellite; outgassing from the satellite body; Earthshine (light reflected from the Earth); and the gravitational forces of Venus and Jupiter.

The devices and methods described herein provide for the generation of accurate navigation solutions for extended periods of time without broadcast ephemeris data through use of accurate predictions of future satellite states. The predictions are generated using an accurate satellite state and force model that is derived from data of past satellite states. The use of past satellite states to generate the model produces a more accurate model that better accounts for the forces acting on the satellites, as described above. Use of a higher accuracy model reduces the propagation errors introduced by a model of relatively lower accuracy. It also helps reduce the curve fit error associated with the quasi-Keplerian parameters for the satellite orbit used in the ephemeris information. Upon identifying parameters that fit the force model, predictions of satellite states at future times are generated using a high-fidelity satellite dynamical motion model.

As discussed previously, satellite clock bias is an essential part of the reconstructed satellite states. Indeed, because extended ephemeris predictions of satellite position are based upon sophisticated numerical models whereas such sophisticated models are inapplicable to predictions of clock bias, clock bias prediction error is the dominant source of error in extended-ephemeris-aided position determinations. Extended ephemeris server 120 provides predictions of satellite clock bias to GPS client device 110 as part of the extended ephemeris data transmitted over communication channel 122. In general, the prediction of satellite clock bias will become more and more erroneous as position estimations are made during the latter part of the period spanned by the satellite state predictions. To address such errors, GPS client device 110 is configured to use broadcast ephemeris data (when available) to compare the predicted clock bias with broadcast-ephemeris-derived clock bias. GPS client device 110 may then form a clock bias correction factor F that equals a broadcast-ephemeris-derived clock bias B minus a predicted clock bias B'. These biases apply to a given time at which the broadcast ephemeris is available. For position determinations subsequent to this given time when broadcast ephemeris is unavailable (thereby using extended ephemeris), GPS client device 110 adds the clock bias correction factor F to the corresponding clock bias predictions to form a corrected clock bias CB equaling B' plus F. It will be appreciated that GPS client device 110 may be configured to always use the corrected clock bias CB regardless of whether a non-zero correction factor F has been calculated. When extended ephemeris is provided to the GPS client device, it may set the correction factor initially at zero. The correction factor may then be calculated as discussed above when broadcast ephemeris is available. Note that the GPS client device may update the correction factor whenever broadcast ephemeris is available. In one embodiment, an extended-ephemeris-derived clock bias prediction B' is derived from a quadratic model such that B' is given as:

$$B'=A_0+A_1*(t-t_{ref})+A_2*(t-t_{ref})^2$$

where t is the clock bias prediction time, $t_{ref}$ is a reference time, and $A_0$, $A_1$, and $A_2$ are coefficients. In a linear model, $A_2$ would equal zero. Given this quadratic (or linear) model, the clock bias correction factor F would be added to the DC coefficient $A_0$.

Figure 2:
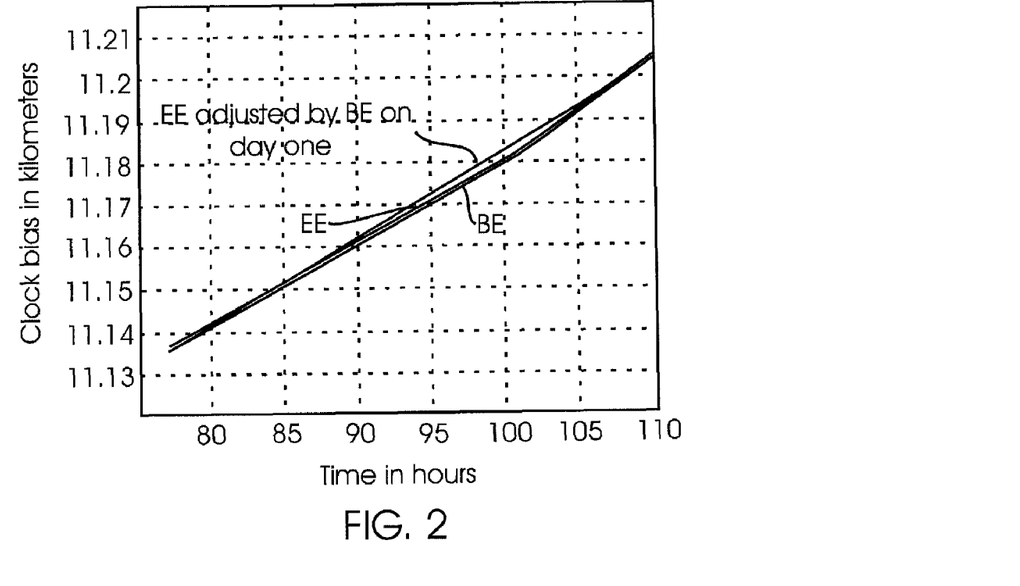
FIG. 2 is a chart illustrating a prediction over seven days for a satellite clock bias, satellite clock bias as derived from broadcast ephemeris during the same seven day period; and a prediction of satellite clock bias modified in the first day of the seven day period based upon broadcast ephemeris.
Figure 3:
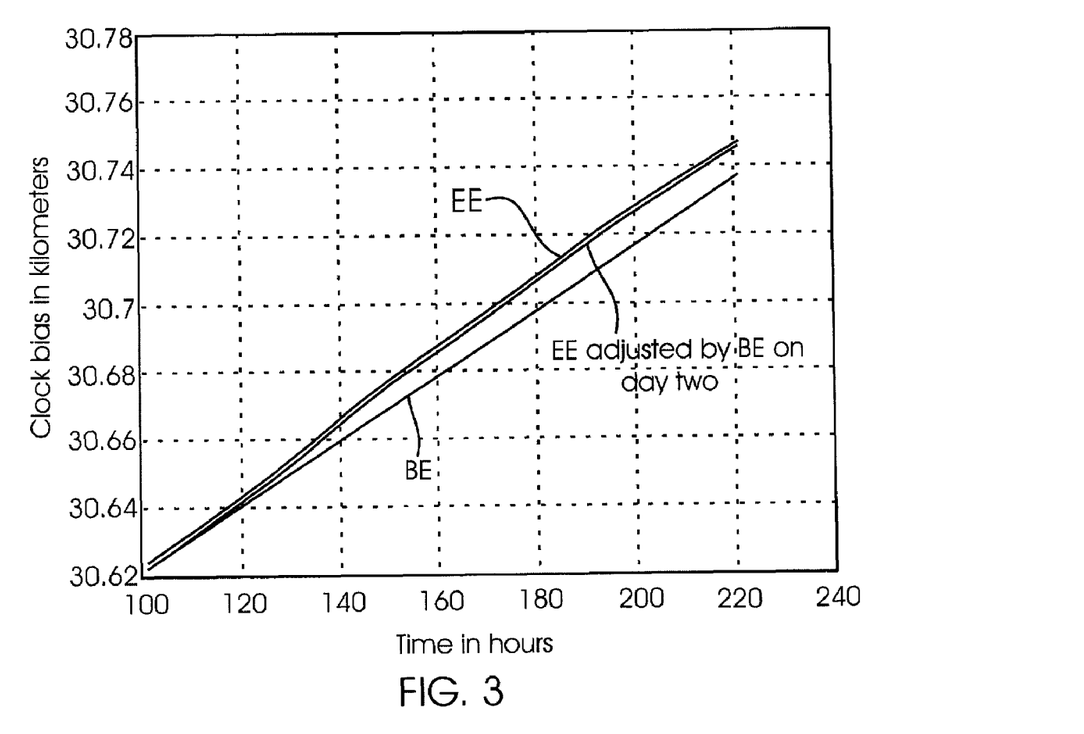
FIG. 3 is a chart illustrating a prediction over seven days for a satellite clock bias, satellite clock bias as derived from broadcast ephemeris during the same seven day period; and a prediction of satellite clock bias modified in the second day of the seven day period based upon broadcast ephemeris.
Figure 4:
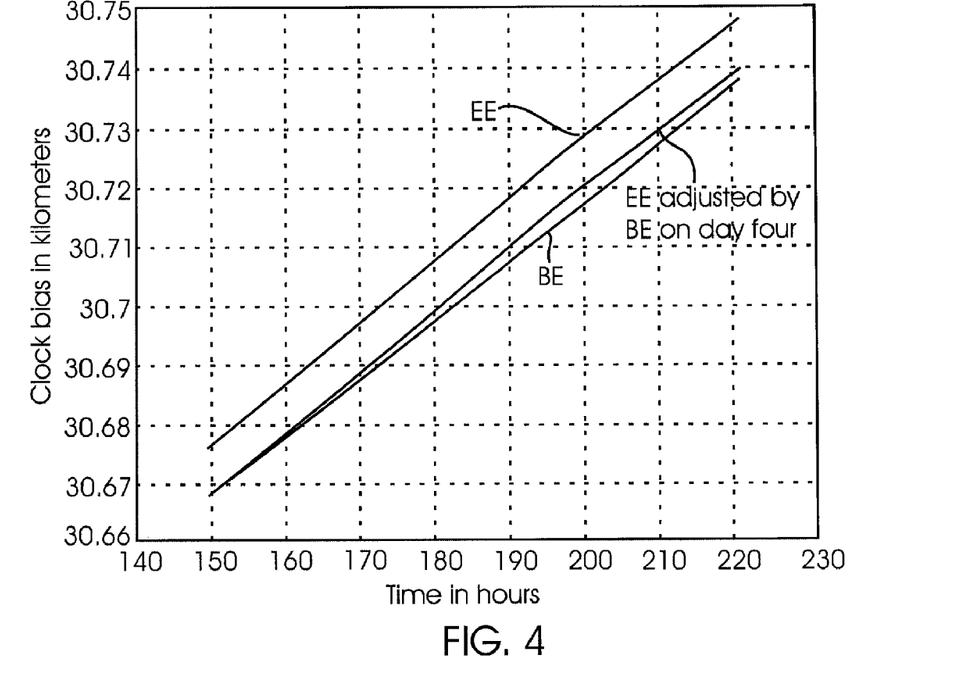
FIG. 4 is a chart illustrating a prediction over seven days for a satellite clock bias, satellite clock bias as derived from broadcast ephemeris during the same seven day period; and a prediction of satellite clock bias modified in the fourth day of the seven day period based upon broadcast ephemeris.
Figure 5:
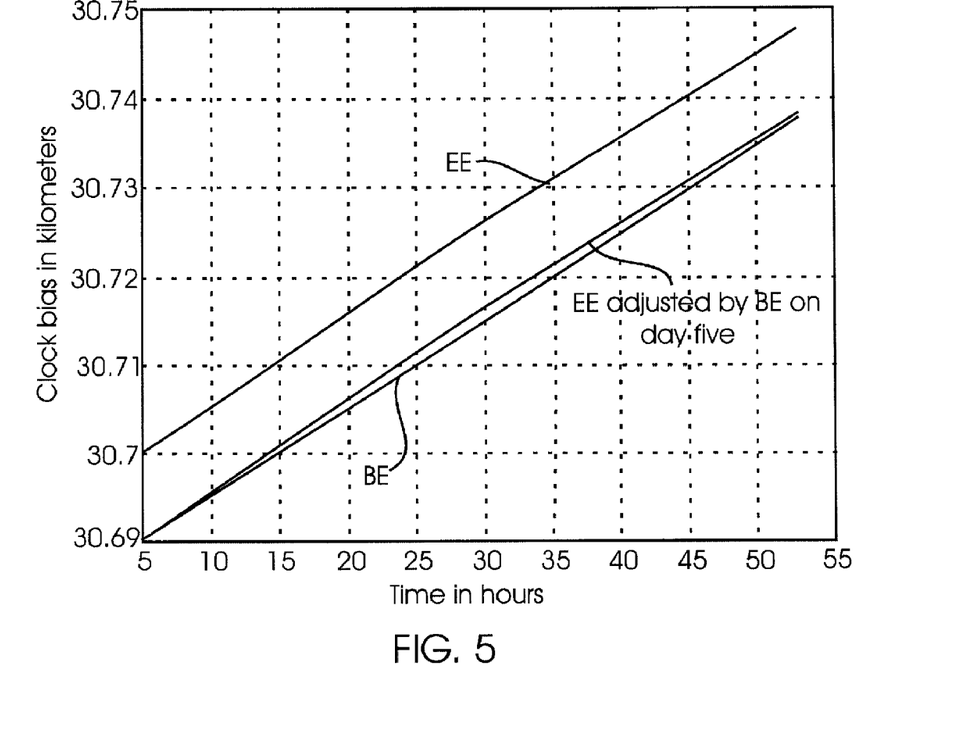
FIG. 5 is a chart illustrating a prediction over seven days for a satellite clock bias, satellite clock bias as derived from broadcast ephemeris during the same seven day period; and a prediction of satellite clock bias modified in the fifth day of the seven day period based upon broadcast ephemeris.

Because the predicted clock error will have relatively little error in the beginning portion of the period spanned by the extended ephemeris predictions, the corrected clock bias CB will typically not differ significantly from either the predicted clock bias B' or the broadcast-ephemeris-derived clock bias B in this portion. For example, if the extended ephemeris spans a week period and the BE-aided clock bias correction is performed on the first day of this week period, the corrected clock bias CB can actually be slightly more inaccurate than the original predicted clock bias B' as seen in FIG. 2. In contrast, as seen in FIG. 3, the corrected clock bias CB for the same satellite is subsequently more accurate than the predicted clock bias B' if the correction is made on day 2 of this week period. It will be appreciated that if the clock bias correction is performed later in the week the benefit of the block bias correction will increase because of the increased error in the predicted clock bias B'. For example, significant accuracy improvement is shown in FIGS. 4 and 5 for the same satellite as shown in FIG. 2 with broadcast-ephemeris-derived corrections being made on day 4 and 5 of the week, respectively.

An integrity check when both extended ephemeris and broadcast ephemeris are available may be performed as follows. A satellite position and corresponding clock bias may be determined from both of these sources at a common time. The differences between the estimated satellite positions and clock biases may then be used in an integrity check on the extended ephemeris data.

In the client when both EE and BE become available, satellite position and clock bias can be found from both of these at a common epoch. The difference between the positions and the difference between clock biases would be used for integrity. The clock bias difference may be transformed into distance by multiplying the clock bias by the speed of light. A suitable threshold may be established such as 100 meters. In one embodiment, if the radial component of the satellite position difference or the clock bias exceeds the threshold, it may be assumed that the extended ephemeris data is too inaccurate for position determinations. If, however, the thresholds are not exceeded, the clock bias correction may be performed as discussed previously.

To determine the validity of extended ephemeris data, a radial direction [rx ry rz] for a satellite may be determined from broadcast ephemeris as $$[rx\ ry\ rz] = [px\ py\ pz]/\mathrm{sqrt}((px^*px + py^*py + pz^*pz))$$

where [px py pz] are the earth centered earth fixed (ECEF) coordinates of the satellite from broadcast ephemeris and [rx ry rz] are the corresponding unit vector components. The radial component of the extended ephemeris satellite position and BE-derived position thus becomes $$\text{radial component} = pdx^*rx + pdy^*ry + pdz^*rz$$

where [pdx pdy pdz] are the differences between satellite coordinates as determined by extended ephemeris and broadcast ephemeris. During a spanned period covered by extended ephemeris, a GPS receiver that practices extended ephemeris position determinations may be receiving broadcast ephemeris such that the radial component may be calculated and compared to the distance threshold. If the distance threshold is exceeded, the extended ephemeris data may be deemed to be invalid.

Figure 6:
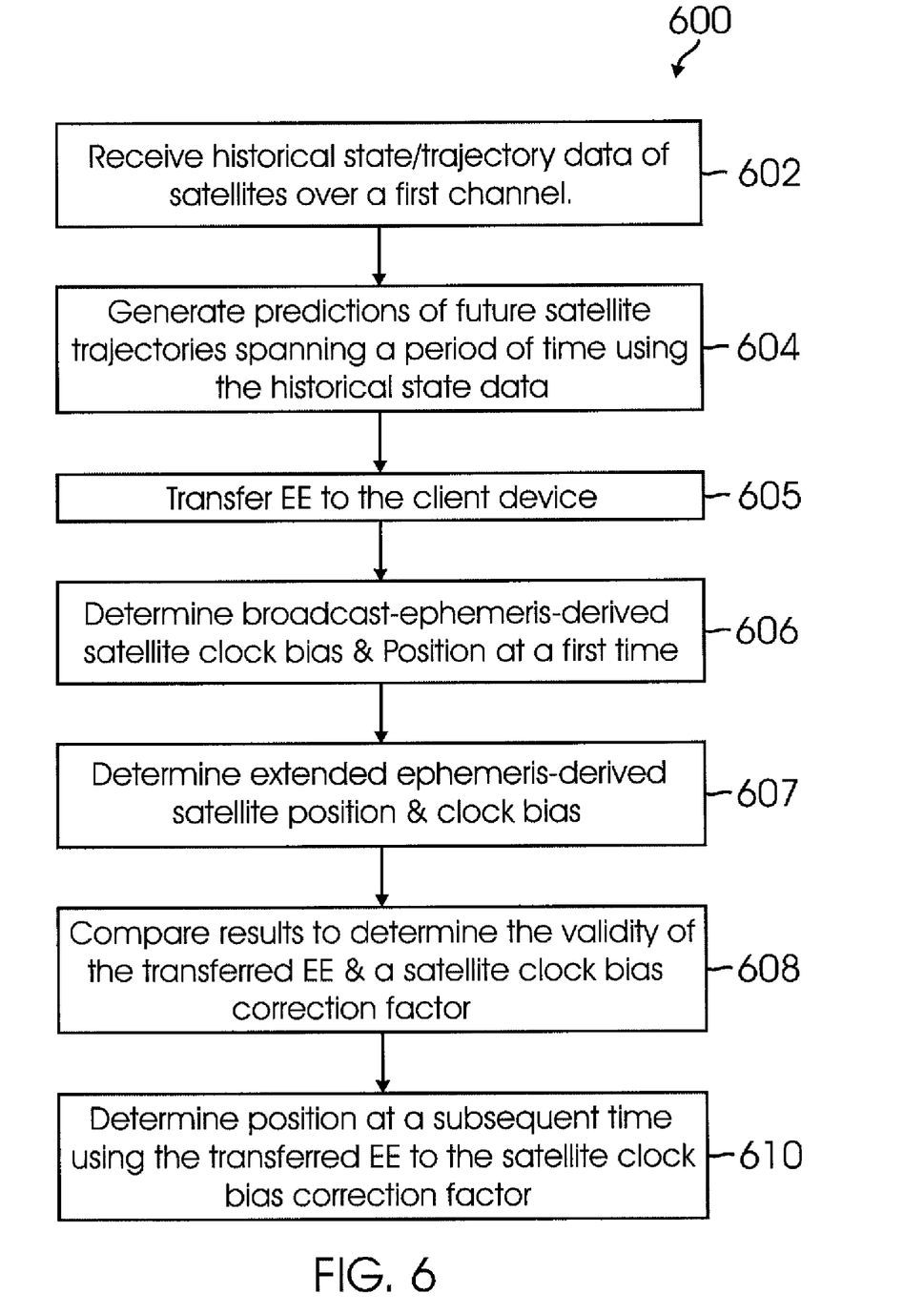
FIG. 6 is a flowchart illustrating a method of calculating current satellite states in accordance with an embodiment of the invention.

FIG. 6 is a flow diagram 600 for determining position information using broadcast-ephemeris-corrected satellite clock bias and extended ephemeris. In operation, a processor-based extended ephemeris server receives or collects historical state or trajectory data (also referred to as historical data) that corresponds to the satellites of a satellite-based positioning system, at a step 602. The historical data is received over a first communication channel or link, for example a wired and/or wireless link to a data provider or database.

The server generates predictions of future satellite trajectories spanning a future time period using the historical data, and performs quality assessment of predicted trajectories, at a step 604. Depending upon whether the satellite states themselves are transmitted as extended ephemeris or parameters derived from these states, the server derives sets of parameters such as Kepler parameters from the predicted satellite states, and transmits the resulting extended ephemeris (EE) data over a first communication channel to the client device(s) at a step 605.

During the spanned time period at a first time when broadcast ephemeris is available, the GPS client device determines broadcast-ephemeris-derived satellite position and clock bias (B) at a step 606. Similarly, the GPS client device determines extended-ephemeris-derived satellite position and clock bias (B') for the same first time at a step 607. At a step 608, the GPS client device compares the results from steps 606 and 607 against a suitable threshold to determine a clock bias correction factor F and also the validity of the transferred extended ephemeris. Finally, at a step 610, the GPS client device determines its position using the transferred extended ephemeris and the clock bias correction factor F at a time during the spanned period subsequent to the first time.

Aspects of the positioning system discussed with regard to may be implemented as functionality programmed into any of a variety of circuitry, including programmable logic devices (PLDs), such as field programmable gate arrays (FPGAs), programmable array logic (PAL) devices, electrically programmable logic and memory devices and standard cell-based devices, as well as application specific integrated circuits (ASICs). Some other possibilities for implementing aspects of the positioning system of an embodiment include: microcontrollers with memory (such as electronically erasable programmable read only memory (EEPROM)), embedded microprocessors, firmware, software, etc. Furthermore, aspects of the positioning system of an embodiment may be embodied in microprocessors having software-based circuit emulation, discrete logic (sequential and combinatorial), custom devices, fuzzy (neural) logic, quantum devices, and hybrids of any of the above device types. Of course the underlying device technologies may be provided in a variety of component types, e.g., metal-oxide semiconductor field-effect transistor (MOSFET) technologies like complementary metal-oxide semiconductor (CMOS), bipolar technologies like emitter-coupled logic (ECL), polymer technologies (e.g., silicon-conjugated polymer and metal-conjugated polymer-metal structures), mixed analog and digital, etc.

The above description of illustrated embodiments of the positioning system and positioning methods is not intended to be exhaustive or to limit the embodiments to the precise form disclosed. While specific embodiments of, and examples for, the positioning system are described herein for illustrative purposes, various equivalent modifications are possible within the scope of the embodiments, as those skilled in the relevant art will recognize. The teachings of the positioning system provided herein can be applied to other electronic systems, not only for the electronic systems described above.

In general, in the following claims, the terms used should not be construed to limit the positioning system to the specific embodiments disclosed in the specification and the claims, but should be construed to include all electronic systems that operate under the claims to provide positioning information. For example, a GPS receiver that calculates future satellite states based upon received broadcast ephemeris could also benefit from the satellite clock bias correction techniques disclosed herein. Accordingly, the positioning system is not limited by the disclosure, but instead the scope of the positioning system is to be determined entirely by the claims.

What is claimed is:

1. A method for determining a position of a client device, comprising:

receiving sets of parameters over a first communication channel, wherein the sets of parameters span a period of time, and wherein each set of parameters is representative of predicted satellite states for a corresponding sub-period of time within the spanned period of time, and wherein the sets of parameters include predictions of satellite clock biases;

during the spanned period of time, receiving broadcast ephemeris over a second communication channel at a given time, the broadcast ephemeris including a broadcast ephemeris clock bias, wherein a subset of the parameters correspond to sub-periods of time subsequent to the given time; and modifying the predictions of satellite clock biases in the subset of parameters based upon the broadcast ephemeris clock bias.

2. The method of claim 1, further comprising:
at a time subsequent to the given time, selectively reconstructing a reconstructed satellite state in the client device using the subset of parameters, wherein the reconstructed satellite state includes the modified prediction of satellite clock bias; and
determining the position of the client device using the reconstructed satellite state.

3. The method of claim 1, further comprising:
based upon the received broadcast ephemeris, calculating a broadcast-ephemeris-derived satellite position; and comparing the broadcast-ephemeris-derived satellite position to a satellite position derived from the received sets of parameters to determine a validity of the received sets of parameters.

4. The method of claim 3, wherein comparing the broadcast-ephemeris-derived satellite position to a satellite position derived from the received sets of parameters comprises comparing a difference between the broadcast-ephemeris-derived satellite position and the satellite position derived from the received sets-of-parameters to a distance threshold.

5. The method of claim 4, wherein the distance threshold is 100 meters.

6. The method of claim 1, wherein the spanned period of time has a length of at least seven calendar days.

7. The method of claim 1, wherein the received sets of parameters are Kepler parameters.

8. The method of claim 1, wherein the predictions of satellite clock bias are derived from a polynomial model.

9. The method of claim 8, wherein the polynomial model is a quadratic polynomial model.

10. The method of claim 1, further comprising comparing the broadcast ephemeris clock bias to a corresponding predicted satellite clock bias to determine a validity of the received sets of parameters.

11. The method of claim 1, wherein the received sets of parameters are differentially-compressed Kepler parameters.

12. A device, comprising:
a state reconstructor that selectively reconstructs a current satellite state based upon predictions of satellite states, wherein the predictions of satellite states span a period of time and include predictions of satellite clock bias, the state reconstructor being configured to modify the predictions of satellite clock bias based upon received broadcast ephemeris; and
at least one signal processor that uses the at least one reconstructed satellite state to acquire a satellite signal.

13. The device of claim 12, further comprising a satellite state predictor operable to provide the predictions of satellite states using broadcast ephemeris previously received from a plurality of satellites.

14. The device of claim 12, further comprising a communication system operable to receive the predictions of satellite states.

15. The device of claim 14, wherein the predictions of satellite states comprise Kepler parameters.

* * * * *